DECODING SYSTEM FOR SELECTIVE INFORMATION DISPLAY

Filed May 26, 1965 Sheet 1 of 2

INVENTOR
WILLIAM H. SAYLOR

BY Wilson, Robbins & Anderson
ATTORNEYS

June 3, 1969 W. H. SAYLOR 3,448,444

DECODING SYSTEM FOR SELECTIVE INFORMATION DISPLAY

Filed May 26, 1965 Sheet 2 of 2

INVENTOR
WILLIAM H. SAYLOR

BY Wilson, Robbins & Anderson
ATTORNEYS 3,448,444
DECODING SYSTEM FOR SELECTIVE INFORMATION DISPLAY William H. Saylor, South Laguna Beach, Calif., assignor to S. S. & S. Company, a partnership
Filed May 26, 1965, Ser. No. 458,973
Int. Cl. G06d *3/14;* H04l *17/16*
U.S. Cl. 340—324 1 Claim

ABSTRACT OF THE DISCLOSURE

A signal-controlled display system is disclosed. Symbols for display are defined in an arcuate array on a display mask which cooperates with a display structure, e.g. an optical unit, to exhibit symbols or the like. The mask is supportably carried on a pivotal structure capable of moving the mask along intersecting paths (at least one of which is arcuate) so as to selectively display the symbols. A mechanical drive unit controllably positions the pivotal structure (and in turn the mask) in accordance with applied digital signals. The system also includes a lock structure to provide memory for the mask, and a mask-incorporated signal generator to assure correct positioning.

The present invention relates to a data decoding system, and more particularly to a system for decoding and manifesting representations of digital electrical signals.

A wide variety of electrical equipment, including that used in the fields of computers and automation, employ electrical signals coded to represent numerical and other data. In conjunction with such equipment, the need frequently arises for an apparatus or system to manifest various representations of data signals. For example, it may be desirable to provide a visual display of a particular symbol represented by a set of binary digital signals.

There are several types of display devices well known in the prior art. However, in general, these devices tend to lack certain desirable characteristics. Specifically, for example, it is often advantageous if a display device is capable of directly utilizing digital code signals to provide a visual output. That is, it is desirable to avoid the need for complex conversion equipment as a part of the display device system. Another desirable characteristic of a display device of the type here considered is rapid response to changed signals. That is, the time delay in manifesting a predetermined symbol after receipt of fresh representative signals should be very short. Of course, as usual in equipment of the type here considered, accurate operation is exceedingly important. Furthermore, sometimes the need arises to employ the display device as a register so that on command it will continue to manifest a prior indicated value, until a change is approved. In addition to these characteristics, it is important that the system be economical to manufacture and maintain.

Accordingly, it is an object of the present invention to provide an improved system that is responsive to digital signals to provide a pre-selected displacement, which system is not subject to these and other disadvantages of various prior structures.

Another object of the present invention is to provide an improved display device that is responsive to binary digital signals to manifest a represented symbol, which device is economical to manufacture and maintain.

A further object of the present invention is to provide an economical decoding system for digital signals, which is capable of self-checking operation, whereby to manifest the occurrence of an error in operation.

A further object of the present invention is to provide a system capable of providing a predetermined displacement, which may be used to manifest a particular symbol, in accordance with applied binary digital signals, which system may be embodied in a relatively small package and is capable of extended trouble-free operation.

One further object of the present invention is to provide an improved digital display apparatus, which may be embodied to operate in conjunction with virtually any code, and which may be designed for rapid response to changes in applied signals, or may alternatively register signals for a predetermined length of time.

Briefly, these and other objects and advantages of the present invention are achieved in accordance with the structural features of one example of the invention, which includes a plurality of actuators having two stable states, which actuators may take the form of solenoid coils. The actuators are adapted to receive the elements of a binary digital code so that depending upon the particular code word, each of the actuators is either energized or deenergized. The actuators are then connected through a series of pivotal linkages so that each actuator accounts for a predetermined displacement of an output member. The output member may take the form of a mask defining apertured symbols which are variously positioned within a light beam to form such beam into a selected symbol for projection and display. The system may also incorporate self-checking and registration facilities.

Further details of these and other novel features of the present invention along with the operation thereof, and additional objects and advantages of the invention will become apparent and may be best understood from a consideration of the following description taken in conjunction with the accompanying drawings, which are all presented by way of illustrative example only; and in which.

Referring to the figures in greater detail, it is stressed that the particulars shown are by way of example only and for purposes of illustrative discussion. The structures are presented in the cause of providing what is believed to be a useful and readily understood description of the principles and concepts of the invention. No attempt has been made to show structural details of the apparatus in greater detail than is necessary for a fundamental understanding of the invention, the description taken with the drawings making apparent to those skilled in the art of the invention, how several forms of the invention may be constructed and practiced. In addition, the detailed showing is not to be taken as a limitation upon the scope of the invention which is defined by the appended claims, the invention which is defined by the appended claim, cation.

Figure 1:
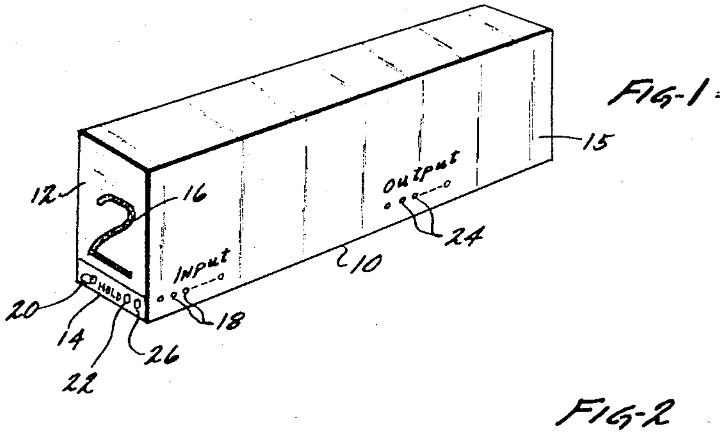
FIGURE 1 is a perspective view of a display device constructed in accordance with the present invention.

Referring now to FIGURE 1, the basic unit 10 may be contained in a somewhat parallelepiped housing, an end surface of which comprises a viewing face 12 and a control panel 14, while a side panel 15 carries connection terminals. Various symbols 16 are presented on the viewing face 12 in accordance with electrical two-state binary signals applied at terminals 18. For example, upon application of a set of binary signals (code word) to the input terminals 18 representative of the number "TWO" in the preselected code, that representative symbol 16 is illuminated on the face 12.

The symbol 16 manifest on the face 12 may be held or registered, until a change is manually commanded or alternatively the operation of the system may be such that response to a change in the applied signals is substantially immediate. Selection of these alternate modes of operation is accomplished by a toggle switch 20 fixed in the panel 14. Specifically, if the switch 20 is in one position, the system responds to changes in the input signals applied at the terminals 18 to manifest different symbols 16. However, if the switch 20 is placed in the other position, the symbol 16 remains, regardless of changes in the input signals applied at the terminals 18, until a push button 22 is depressed to command a change. In the latter mode of operation, the system serves as a register or memory apparatus holding a particular symbol or value until a change is permitted.

In addition to manifesting a symbol 16, the device also provides output signals at terminals 24 which represent the symbol 16 in the selected, or an alternative code form. In the system of FIGURE 1, the output signals appearing at the terminals 24 are utilized within the system for checking purposes and may be employed in auxiliary external apparatus, particularly when the system hereof is employed as a register. Within the system, the input signals applied to the terminals 18 are compared with the independent output signals appearing at the terminals 24, and in the event of dissimilarity, a light 26 on the panel 14 is energized. Depending upon the current operating mode of the device, the light 26 may indicate: a malfunction in the operation of the system, a change in the input signals during the mode of operation while symbols are held or locked, or various other operating conditions.

Figures 2, 3:
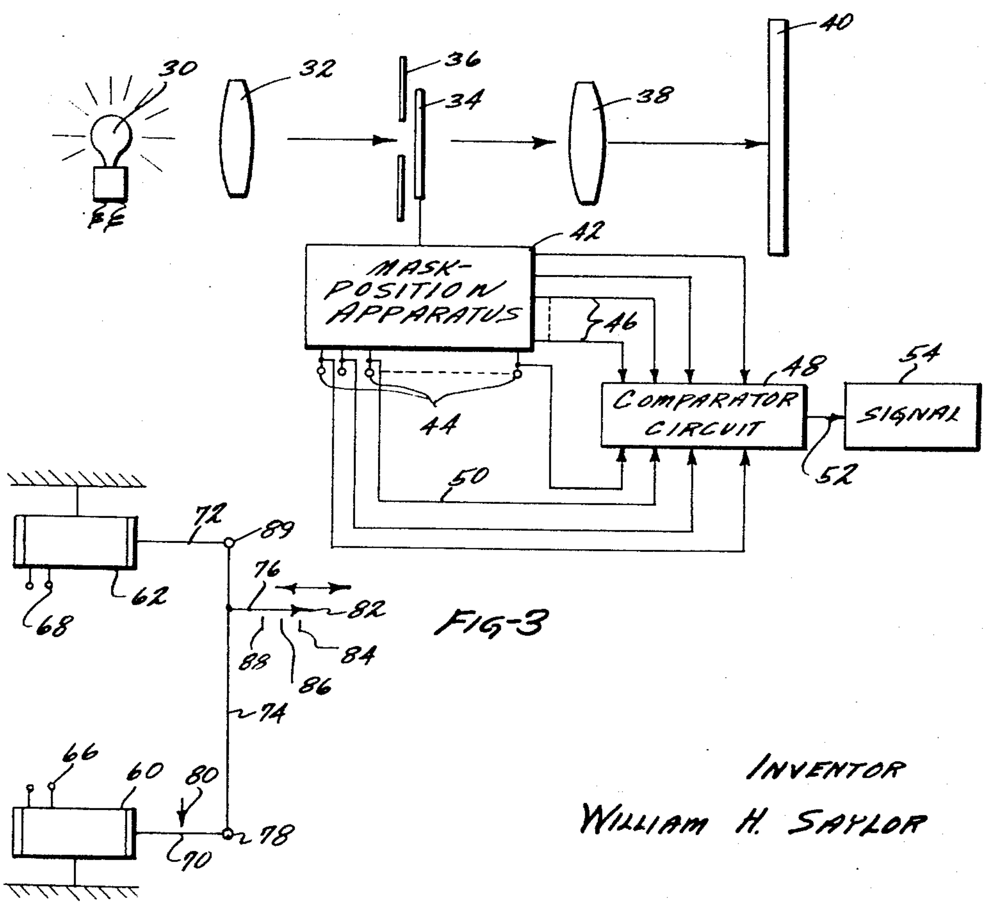
FIGURE 2 is a diagrammatic representation of the system embodied in FIGURE 1.
FIGURE 3 is a diagrammatic representation illustrating the operation of a portion of the system of FIGURE 1.

Considering the operation of the system in greater detail, reference will now be made to FIGURE 2 showing a light source 30, from which a lens 32 condenses light to impinge upon a mask 34 through an aperture member 36. The mask 34 has openings therethrough to define the various symbols 16. As a result, light striking the mask 34 is formed into a symbol-representing light beam which is projected by a lens 38 onto a viewing face or screen 40. Thus, the screen 40, which may comprise frosted glass provides the display face 12 as shown in FIGURE 1.

Thus, the symbol manifest on the screen 40 depends upon the position of the mask 34 to expose a selected symbol, which position is in turn controlled by a mask-position apparatus 42. Specifically, the apparatus 42 variously displaces the mask 34 in a plane perpendicular the light beam, so as to set a symbol under the aperture in the member 36 which is selected in accordance with the binary digital signals applied at the terminals 44. These terminals coincide electrically to the input terminals 18. In this manner, the mask-position apparatus 42 imparts a predetermined displacement to the mask 34 in accordance with the applied binary signals resulting in the manifestation of a selected representative symbol on the screen 40.

The mask position apparatus 42 also provides signals on conductors 46 representative of the actual position of the mask 34, in accordance with a preselected code. The signals from the conductors 46 are available at terminals 24 (FIGURE 1) and are also applied to a comparator circuit 48 (FIGURE 2) along with signals from the terminals 44 applied through conductors 50 for comparison. The comparator circuit 48 may take a variety of forms as well known in the prior art, to provide an output voltage in a conductor 52 at a time when the set of signals received in the conductors 46 do not coincide to the set of signals received in the conductors 50. Various forms of such well-known structures are described beginning on page 290 of a book entitled "Arithmetic Operations in Digital Computers," by R. K. Richards, published by D. Van Nostrand Co., Inc.

The signal appearing in the conductor 52 is applied to a visual signal 54 which may take various forms including the light 26 as shown on the panel 14 of FIGURE 1. Of course, various other visual or audio signals for example may be provided in addition to, or separate from, the light 26.

Considering the operation of the mask-position apparatus 42 to properly displace the mask 34 two-dimensionally within its plane, reference will be made preliminary to FIGURE 3. The binary signals to be decoded are applied to actuators, which may take the form of solenoid coils 60 and 62 as shown in FIGURE 3. The lowest-significant binary digit signal, for example, may be applied to the terminals 66 of the coil 60 and would therefore energize the coil 60 when representative of a "ONE" and leave the coil de-energized when representative of a "ZERO." Similarly, the second-most significant digit (having a decimal significance of "TWO" for example) may be applied to the coil 62 through terminals 68, so as to energize the coil 62 when representative of a "ONE" and to leave the coil de-energized when representative of a "ZERO."

The coils 60 and 62 are firmly anchored so that their energization actuates armatures 70 and 72 respectively, which are pivotally interconnected by a link member 74 supporting a yoke extension 76 displaced from the center of the link member 74. Considering the operation of the diagrammatic representation, energization of the coil 60 actuates the armature 70 to draw the pivot joint 78 approximately to a position indicated by an arrow 80. Assuming that the coil 62 remains de-energized, movement of the pivot point 78 to the location 80, moves the tip 82 of the extension to a line 84.

In an alternative situation, energization of the coil 62, while the coil 60 remains unenergized, moves the armature 72 pulling the joint 89 to pivot about the joint 78 and setting the tip 82 in alignment with the line 86. As may be seen, the energization of both the coils 60 and 62 withdraws the tip 82 to the point of alignment with the line 88. As a result, four distinct positions are provided depending upon the energization of the coils 60 and 62. Thus, the two-bit binary code word, capable of manifesting four values, accomplishes four distinct positions. In general, this somewhat fundamental principle is incorporated into a system of the present invention as will now be considered with respect to FIGURE 4, to accomplish the various objectives hereof in one exemplary form.

Figure 4:
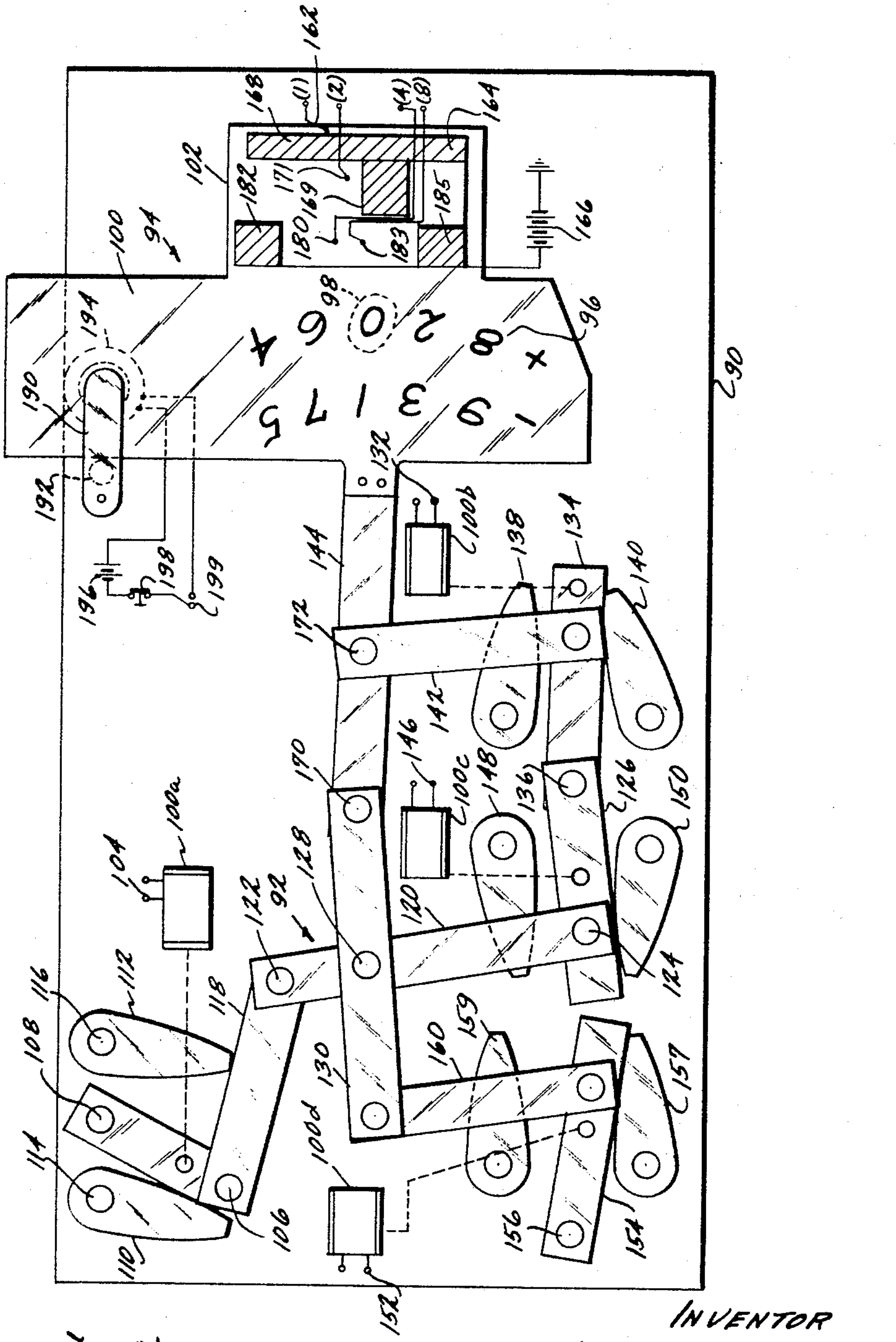
FIGURE 4 is a plan view and diagrammatic representation of an element in the system of FIGURE 1.

In the structure of FIGURE 4 a support base 90 carries a system of linkages 92 activated by solenoid coils considered below to variously position a mask 94. The mask defines apertured symbols 96 which may be employed to form a symbolic light beam to illuminate symbols 16 as shown in FIGURE 2. Depending upon the manner in which the solenoid coils in the system set the mask 94, a particular one of the symbols 96 is positioned within a light beam 98 (indicated in FIGURE 4) to form the light beam sectionally into a representation of the desired symbol.

The mask 94 also includes a locking section 100 which is engaged as described below to lock the mask in a preselected position. A coding section 102 is also carried on the mask 94 to provide output signals manifesting the true and actual position of the mask. Of course, these signals are generally provided in the same code as the input signals to the system to enable comparison; however, a translated form may also be provided if desired.

The mask-positioning system, as shown, includes solenoid coils 100*a*, 100*b*, 100*c*, and 100*d*. These coils are connected to individually receive the elements or digits of a four-bit binary code word, the decimal equivalent values of which are set forth in the following chart, and are spring loaded to a release position that is assumed when they are not energized. Of course, other techniques and structures can be employed.

| Decimal Value | 100d | 100c | 100b | 100a |
|---|---|---|---|---|
| 0 | 0 | 0 | 0 | 0 |
| 1 | 0 | 0 | 0 | 1 |
| 2 | 0 | 0 | 0 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| + | 1 | 0 | 1 | 0 |
| − | 1 | 0 | 1 | 1 |

Figure 5:
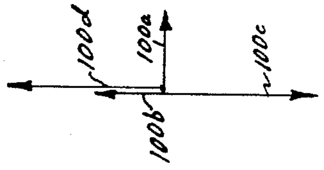
FIGURE 5 is a diagram illustrative of the operatior of the system.

It may therefore be seen, that the coil 100*a* is connected to receive the least-significant digit of a binary word while the coils 100*b*, 100*c*, and 100*d*, are connected to receive the progressively higher digit signals of the code. Correlating these values to the position of the symbols 96 in the mask 94 it is evident that the coil 100*a* accounts for a horizontal shift of the mask to position the symbol "1," in the light beam 98. The coil 100*b* acts to position the mask 94 vertically by one amount of displacement, while the coils 100*c*, and 100*d* each act to vertically position the mask by twice that displacement. The coil 100*d* moves the mask up while the coil 100*c* moves it down. In this regard, FIGURE 5 is a vector diagram of the mask movement with each vector identified by the same designation as the coil which produces resultant displacement indicated.

Considering the system in greater structural detail, the solenoid 100*a* is energized through terminals 104 and mechanically coupled to an arm 106 mounted on the base 90 at a pivot point 108. The arm 106 may, therefore, be pivotally moved between two stable positions determined by adjustable stops 110 and 112 locked in position on the base 90 by threadable engagement therewith by a pair of screws 114 and 116. The arm 106 is pivotally connected to a three-connection linkage 120. Specifically, the upper end of the linkage 120 is connected to the linkage 118 at a pivot point 122 while the lower end of the linkage 120 is connected at a pivot point 124 to a pivotally mounted arm 126. At a location that is off center between the pivot points 122 and 124 lies a pivot point 128 at which the linkage 120 is connected to a transverse linkage 130.

The coil 100*b*, energized through terminals 132 acts on an arm 134 commonly mounted at a pivot point 136 with the arm 126. The arm 134 moves between limit stops 138 and 140 similar to those previously described. The coupling from the arm 134 to the output member or mask 94 is through a linkage 142 pivotally connected to the arm 134 and to an extension 144 rigidly connected to the mask 94.

The coil 100*c* energized through terminals 146 is coupled to the arm 126, position of which is controlled by limit stops 148 and 150. In a somewhat similar fashion, the coil 100*d* energized through terminals 152 is mechanically coupled to an arm 154 pivotally mounted about a pivot point 156 between stops 157 and 159, and in turn coupled at a pivot point 158 to a linkage 160 that is connected to the end of the linkage 130.

According to the detailed operation of the system, energization of the coil 100*a* moves the arm 106 from a dwell position against the limit stop 110 to a dwell position against the limit stop 112. This movement is transmitted through the linkage 118 and the linkage 120 to displace the linkage 128 to the right, moving the mask so that the symbol "1" lies in the beam 98. It is to be noted, that this movement displaces the section 102 to the right moving a sliding contact 162 onto a conductive segment 164, and producing the high level of a binary signal at the "1" output terminal. The conductive segment 164 is connected along with similar conductive segments on the section 102 to a battery 166 the other side of which is connected to a source of reference potential. Therefore, when the mask 94 is displaced to the right, setting the conductive section 164 under the contact 162, a voltage-level signal appears at one of the terminals 168 to indicate the least significant digit of a binary code word. In this regard, the signals developed at the terminals 68 are in a code similar to that set forth in the above chart with the terminals 168 carrying digits in a significance of descending order; however, other arrangements can be provided within the scope hereof.

The second most significant digit in the binary code operates on the coil 100*b* which functions through the arm 134 and the linkage 142 to individually displace the mask 94 so that the symbol "2" is moved into the light beam 98. Of course, other symbols 96 may actually be positioned in the beam 98; however, such position is accomplished by energization of more than the coil 100*b*.

The upward movement of the mask 94 accomplished by the coil 100*b* shifts the conductive segment 169 under a contact 171 to provide an output binary signal representative of the second least-significant digit.

Considering the energization of coil 100*c*, indicative of the third-least significant digit in the code word, the armature acts through the arm 126, linkage 120, linkage 130 and pivot point 170 to pivotally move the extension 144 about the pivot point 172 so as to lower the mask individually changing the dwell position of the beam 98 from the "0" symbol to the "4" symbol. This movement results in a contact 180 dwelling on a conductive segment 182 to provide the high level of a two stage signal to the third-least significant digit terminal of the terminals 168.

Last, the energization of the coil 152 by the least-significant digit of the input code moves the arm 154 from a dwell position against the limit stop 157 to the stop position against the stop 159 thereby causing the linkage 130 to pivot about the pivot point 128, lowering the pivot junction 170 and thereby raising the mask 94 so that the symbol "8" lies in the path of the beam 98. This movement results in the contact 183 dwelling on the conductive segment 185 to provide the high-state output signal of the most-significant digit at the last of the terminals 168.

Consideration of possible combinations of these various movements as described above and indicated in FIGURE 5, attendant energization of each of the coils will indicate that such movements properly position a symbol 96 in the path of the light beam 98 representative of the applied code. Furthermore, the various positions also set the contacts on a selected segments on the mask section 102 to energize the terminals 168 in accordance with the select code. In this regard, it is to be noted, that the manifestation at the terminals 168 is truly representative of the position of the mask 94 and therefore of the symbol 96 which is being represented. As a result, any malfunction of the system is manifest by the presence of a different set of signals from those desired to be represented. Of course, such a difference is also manifest, as described above when the system is operated to lock on and register a set of signals until released for subsequent operation.

The registration function of the system is provided by a clamp 190 biased to a position away from the section 100 of the mask by a spring 192; however, engageable with the mask under the attractive force of a solenoid coil 194. The coil is connected in series with a battery 196, a momentary-contact switch 198, and a toggle switch 199. During intervals when it is desired to lock a manifest value into registration, the toggle switch 199 is closed with the result that the clamp 190 holds the mask against any movement. Upon depression of the momentary-contact switch 198, the circuit is broken permitting the mask to move in a position to manifest the current signals. Thereafter, releasing the momentary-contact switch 198 again restores the registration or lock on operation of the system. Of course, during intervals when immediate response operation is desired, the switch 199 is simply opened de-energizing the solenoid 194 so that the mask may be readily positioned to follow various code words presented to the system.

In the construction of the system it has been found advantageous to determine the location and form of the symbols 96 in the mask by analytical techniques. Particularly to compensate for the tangential effect, a large mask is made and set for pivotal displacement as will occur. The form and position of the symbols is thus established.

Thus, it is evident that the system may be accomplished to function with relative simplicity, and to present symbols in accordance with virtually any desired code. Furthermore, the system may be relatively inexpensively manufactured and embodied in a unit occupying relatively little physical space. Other features include rapid response to changed input signals, self-checking characteristics, and registration of values previously received.

It is thus apparent that the example described above achieves the objects and exhibits the advantages as herein set forth.

What is claimed is:

1. An information display system for selectively presenting one of a set of symbols for display, in accordance with predetermined digital code signals, comprising:

a display mechanism, having a display aperture space, said display mechanism for displaying the content of said aperture space;

a display mask, having said symbols defined thereon in an array that is distorted to an arcuate pattern;

a pivot-structure means including a plurality of substantially parallel and substantially perpendicular pivot linkages connected to support said mask whereby to allow for movement of said mask along substantially perpendicular paths;

means for receiving said digital code signals to drive said pivot-structure means in accordance with received digital code signals along said substantially perpendicular paths whereby to position a selected symbol defined on said mask, in said aperture space by moving said mask along said paths;

locking means for engaging said display mask, whereby to retain said mask in a selected position;

signal-forming means including an integral coding section connected to said mask for providing signals indicative of the position thereof;

means for comparing said signals indicative of the position of said mask with said digital code signals to indicate coincidence.

References Cited

UNITED STATES PATENTS

| | | | |
|---|---|---|---|
| 922,399 | 5/1909 | Dawson et al. | 340—324 |
| 2,406,977 | 7/1936 | Sortore et al. | 340—324 |
| 3,009,134 | 11/1961 | Brosh | 340—324 |
| 3,222,666 | 12/1965 | Hallden | 340—324 |
| 3,098,223 | 7/1963 | McNaney | 340—347 |
| 3,103,007 | 9/1963 | Gumpertz | 340—324 |
| 3,234,546 | 2/1966 | Ellner et al. | 340—347 |
| 3,255,960 | 6/1966 | Maples | 340—347 |
| 3,042,912 | 7/1962 | Gilbert | 340—324 |

JOHN W. CALDWELL, *Primary Examiner.*

M. M. CURTIS, *Assistant Examiner.*

U.S. Cl. X.R.

178—33